US009722791B2

(12) United States Patent
Schibuk

(10) Patent No.: US 9,722,791 B2
(45) Date of Patent: Aug. 1, 2017

(54) THREE-TIERED SECURITY AND COMPUTATIONAL ARCHITECTURE

(71) Applicant: InferSpect, LLC, Wellesley, MA (US)

(72) Inventor: Norman Schibuk, Merrick, NY (US)

(*) Notice: Subject to any disclaimer, the term of this patent is extended or adjusted under 35 U.S.C. 154(b) by 256 days.

(21) Appl. No.: 14/712,769

(22) Filed: May 14, 2015

(65) Prior Publication Data

US 2015/0333908 A1 Nov. 19, 2015

Related U.S. Application Data

(60) Provisional application No. 61/996,704, filed on May 14, 2014.

(51) Int. Cl.
*H04L 29/06* (2006.01)
*H04L 9/32* (2006.01)

(52) U.S. Cl.
CPC .......... *H04L 9/321* (2013.01); *H04L 63/0281* (2013.01); *H04L 63/0471* (2013.01); *H04L 63/08* (2013.01); *H04L 63/10* (2013.01); *H04L 2209/76* (2013.01)

(58) Field of Classification Search
None
See application file for complete search history.

(56) References Cited

U.S. PATENT DOCUMENTS

| 7,257,706 | B1 | 8/2007 | Zucker | 713/163 |
|---|---|---|---|---|
| 7,370,351 | B1* | 5/2008 | Ramachandran | H04L 63/08 726/4 |
| 8,776,212 | B2* | 7/2014 | Schibuk | H04L 9/321 713/189 |
| 2003/0033545 | A1 | 2/2003 | Wenisch et al. | 713/202 |
| 2006/0225132 | A1 | 10/2006 | Swift et al. | 726/11 |
| 2008/0299989 | A1* | 12/2008 | King | G01S 5/02 455/456.1 |

(Continued)

OTHER PUBLICATIONS

International Searching Authority, International Search Report—International Application No. PCT/US2015/030902, dated Aug. 19, 2015, together with the Written Opinion of the International Searching Authority, 9 pages.

(Continued)

*Primary Examiner* — Jeffery Williams
(74) *Attorney, Agent, or Firm* — Sunstein Kann Murphy & Timbers LLP

(57) ABSTRACT

A computing system, method, and computer program product provide cryptographic isolation between a client device and a server computer for providing a network service to the client device. The computing system stores encrypted user authentication data of the client device and its user, and encrypted service authorization data of the server computer in such a way that neither the client device nor the server computer can obtain information about the other. Upon subsequent receipt in the computing system of purported user authentication data and a request to access the network service, the computing system encrypts the purported authentication data and compares it against the stored, encrypted data. Only when these encrypted data match is the computing system able to decrypt the service authorization data and provide it to the server computer to gain access to the network service.

20 Claims, 6 Drawing Sheets

(56) References Cited

U.S. PATENT DOCUMENTS

| | | | |
|---|---|---|---|
| 2012/0159165 A1* | 6/2012 | Schibuk | H04L 9/321 |
| | | | 713/168 |
| 2012/0191615 A1* | 7/2012 | Schibuk | G06Q 20/3821 |
| | | | 705/75 |
| 2013/0061310 A1 | 3/2013 | Whitmyer, Jr. | 726/9 |
| 2013/0166920 A1* | 6/2013 | Cousins | G06F 12/1408 |
| | | | 713/189 |
| 2014/0019745 A1 | 1/2014 | Dodgson et al. | 713/150 |
| 2014/0304523 A1* | 10/2014 | Schibuk | H04L 9/321 |
| | | | 713/189 |
| 2015/0244684 A1* | 8/2015 | Ng | H04L 67/10 |
| | | | 713/168 |
| 2015/0281204 A1 | 10/2015 | Ellis et al. | 726/9 |
| 2015/0356311 A1* | 12/2015 | Cousins | G06F 12/1408 |
| | | | 713/189 |
| 2015/0365412 A1* | 12/2015 | Innes | H04L 63/08 |
| | | | 726/7 |
| 2016/0269393 A1* | 9/2016 | Corella | H04L 63/083 |

OTHER PUBLICATIONS

Elish et al., Device-Based Isolation for Securing Cryptographic Keys, The 3$^{rd}$ International Symposium of Internet for Ubiquitous and Pervasive Things, Procedia Computer Science, vol. 19, pp. 1130-1135 (2013).

* cited by examiner

THREE-TIERED SECURITY AND COMPUTATIONAL ARCHITECTURE

CROSS-REFERENCE TO RELATED APPLICATION

This application claims the benefit of U.S. Provisional Application No. 61/996,704, filed May 14, 2014, the contents of which are incorporated herein by reference in their entirety.

TECHNICAL FIELD

The present invention relates to multicomputer data transferring, and more particularly to distributed data processing in which a processing agent provides a cryptographically secure virtual presence for a network user.

BACKGROUND ART

Computer systems today are insecure. They suffer from a multitude of security problems, including system cracking, system disruption, and malicious impersonation of users. Some malicious persons ("system crackers") break into systems, bypassing or cracking their security mechanisms. These system crackers can gain access to secure data and systems, change or corrupt important data, change or corrupt the security systems themselves to install back doors or permit physical access to restricted premises, or commit any number of secondary crimes using their unauthorized access to sensitive data. Other malicious persons can disrupt system function, for example committing denial-of-service (DoS) attacks by flooding a computer system with an overwhelming torrent of unwanted and disrupting data, thereby changing or delaying the way a system responds. Such DoS attacks may disrupt important aviation, public transportation, and emergency response systems, leaving our key infrastructure systems vulnerable. Other malicious persons may impersonate doctors, lawyers, law enforcement, or other trusted personnel to gain access to restricted data and services. For example, a false identity may allow a malicious person having weapons to gain access to the sterile area at an airport, and board an airplane.

Several solutions to these security problems exist in the art, and include: login names and passwords; firewalls to exclude unauthorized access to computer systems; one-time passwords for isolated transactions; smartcards, such as those compliant with HSPD-12 and FIPS 201; access control lists; and virtual private computer networks, among others. One such solution in the prior art is shown in FIG. 1. Here, a requester 100 wishes to gain access to network data and services, represented in the figure by a "processing cloud" 130 that may be a single server computer or a network of computing resources. The requester 100 has access to a requester device 110. Typically, the requester 100 will login to the requester device 110 using a user name and password, as noted above. Next, requester 100 will direct a software application running on requester device 110 to attempt to contact a network service in the cloud 130 using a computer network (not shown). Requester device 110 will normally look up an Internet address associated with a name provided for the service, such as www.google.com, using a database service such as the Domain Name Service (DNS), as is known in the art. Requester device 110 then attempts to contact the service using the Internet address. Conversely, the service routes all such incoming requests through a firewall 120. The firewall provides security services, such as prevention of DoS attacks, authorization and authentication challenges to access the service, port forwarding, virus scanning, and so on. If the firewall 120 determines that the attempted access is legitimate, then it provides requester device 110 a data channel that permits access to the service. Typically, firewall 120 maintains this data channel, but does not otherwise monitor the data that pass through it. This data channel may be encrypted by both the requester device 110 and the service in the cloud 130, using techniques known in the art such as SSL. Once the transaction is complete, the data channel is "torn down" to free up processing resources on requester device 110, firewall 120, and cloud service 130.

Such prior art security measures generally establish system protection once, at the perimeter of the system being secured, not within the system itself. They are concerned with protecting access to the secure computing resources, such as the communications channels, rather than protecting the data that is transmitted to and from these resources-once a malicious person has gained access, they may remove sensitive data without further challenge. Further, the access restrictions of the prior art are performed before, or as part of, any determination of the identity of the person requesting the access. Thus, they suffer from impersonation attacks and man-in-the-middle (MitM) attacks. Even worse, in systems that perform encryption and decryption operations, these operations must be conducted by and on "thin" client devices, such as smart phones, that do not have a great deal of computing power in the first instance. The systems in the art for distributing encryption and decryption keys to the millions of such devices are cumbersome, expensive, and do not scale well.

End user systems, even those that use encryption, cannot be fully trusted in a secure environment due to the threat of compromise. Once system security is cracked by a malicious user ("system cracker"), the system cracker can masquerade as a legitimate user by accessing the data and algorithms stored in and used by the system. These "artifacts" of the identity processes, present on all end user systems that perform secure transactions, provide an unwanted attack vector against transaction systems that rely on verified identities, decreasing the security and reliability guarantees offered by these systems.

SUMMARY OF ILLUSTRATED EMBODIMENTS

To address the aforementioned disadvantages, illustrated embodiments of the present invention provide a "personal security server", or PSS. A PSS is a proxy system interposed between the client device and the multitude of network services that provides cryptographic isolation between the client device and the server computer that provides the service. Such a system may be used in addition to a firewall or other perimeter device to supplement the functionality of that device. The PSS prevents the client device from obtaining any information about the server computer, including its network address, and prevents the server computer from obtaining any information about the client device that is requesting the service. Access to service authorization data requires input that can only be provided by the user of the client device.

Compromise of any of the devices in the three-tiered security architecture no longer can result in execution of an unauthorized transaction or identity theft. If the client device or PSS is compromised, the malicious user is unable to access any services previously accessed by the client device because such access may only be obtained through the PSS, which requires separate authorization from the proper user of the client device using a biometric or a password. If the server computer or PSS is compromised, the attacker will find no personal information of the user that can be used to steal the user's identity.

Thus, a first embodiment of the invention is a computing system for providing cryptographic isolation between a client device and a server computer for providing a network service to the client device. The computing system has four components: a first data port coupled to the client device; a second data port coupled to the server computer; a non-transitory, tangible storage medium; and a computing processor.

The storage medium stores an encryption, using an irreversible encryption algorithm, of original user authentication data that are a function of a unique property of the client device and a unique property of a user of the client device. The storage medium also stores an encryption, using a reversible encryption algorithm that uses the original user authentication data as a decryption parameter, of service authorization data required by the server computer to be presented to the server computer as a condition of permitting the user to access the network service.

The computing processor is configured to receive purported user authentication data in combination with a request to access the network service, and in response to such receipt, to perform four processes. The first process is encrypting the purported user authentication data using the irreversible encryption algorithm to produce encrypted purported user authentication data. The second process is decrypting the encryption of the service authorization data to produce decrypted service authorization data, but only when the encrypted purported user authentication data matches the stored encryption of the original user authentication data. The third process is presenting, to the server computer using the second data port, the decrypted service authorization data in combination with a request to access the network service on behalf of the user. The fourth process is, upon receipt in the computing system from the server computer of data indicating that the user is authorized to access the network service, exchanging service data between the client device using the first data port and the server computer using the second data port.

Various refinements of the basic system are contemplated. In particular, the client device may be a desktop computer, laptop computer, tablet computer, or smartphone. The first data port may be coupled to a local area network. The second data port may be coupled to the Internet. The irreversible encryption algorithm may include a cryptographic hash function. The reversible encryption algorithm may be a public key encryption algorithm or a symmetric encryption algorithm. The unique property of the client device may include a universally unique identifier (UUID) or a globally unique identifier (GUID). The unique property of the user of the client device may be a biometric or a password known only to the user. The computing processor may be further configured to perform cryptographic data communications over the first data port using a secret shared only between the computing system and the client device. The computing processor may be further configured to perform cryptographic data communications over the second data port using a secret shared only between the computing system and the server computer. And the computing processor may be further configured to avoid communicating a network address of the client device to the second data port, and to avoid communicating a network address of the server computer to the first data port.

Another embodiment of the invention is a method of providing cryptographic isolation between a client device and a server computer for providing a network service to the client device, using a computing system that intermediates between the client device and server computer. The method includes six processes. The first process is, at the request of the client device, storing by the computing system, an encryption, using an irreversible encryption algorithm, of original user authentication data that are a function of a unique property of the client device and a unique property of a user of the client device. The second process is, at the request of the server computer, storing by the computing system, an encryption, using a reversible encryption algorithm that uses the original user authentication data as a decryption parameter, of service authorization data required by the server computer to be presented to the server computer as a condition of permitting the user to access the network service.

The remaining processes occur upon receipt in the computing system, of purported user authentication data in combination with a request to access the network service. The third process is encrypting the purported user authentication data using the irreversible encryption algorithm to produce encrypted purported user authentication data. The fourth process is decrypting the encryption of the service authorization data to produce decrypted service authorization data, but only when the encrypted purported user authentication data matches the stored encryption of the original user authentication data. The fifth process is presenting, to the server computer, the decrypted service authorization data in combination with a request to access the network service on behalf of the user. The sixth process is, upon receipt in the computing system from the server computer of data indicating that the user is authorized to access the network service, exchanging service data between the client device and the server computer.

The refinements describe above with respect to the system embodiment may also be applied to the method embodiment.

A third embodiment of the invention is a non-transitory, tangible storage medium in which is stored computer program code for providing cryptographic isolation between a client device and a server computer for providing a network service to the client device, using a computing system that intermediates between the client device and server computer. The storage medium comprises computer program code for performing the processes of the method embodiment described above. The storage medium may also include computer program code for performing any of the refinements of the method embodiment.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

A computing system, method, and computer program product provide cryptographic isolation between a client device and a server computer for providing a network service to the client device. The computing system stores encrypted user authentication data of the client device and its user, and encrypted service authorization data of the server computer in such a way that neither the client device nor the server computer can obtain information about the other. Upon subsequent receipt in the computing system of purported user authentication data and a request to access the network service, the computing system encrypts the purported authentication data and compares it against the stored, encrypted data. Only when these encrypted data match is the computing system able to decrypt the service authorization data and provide it to the server computer to gain access to the network service.

Figure 1:
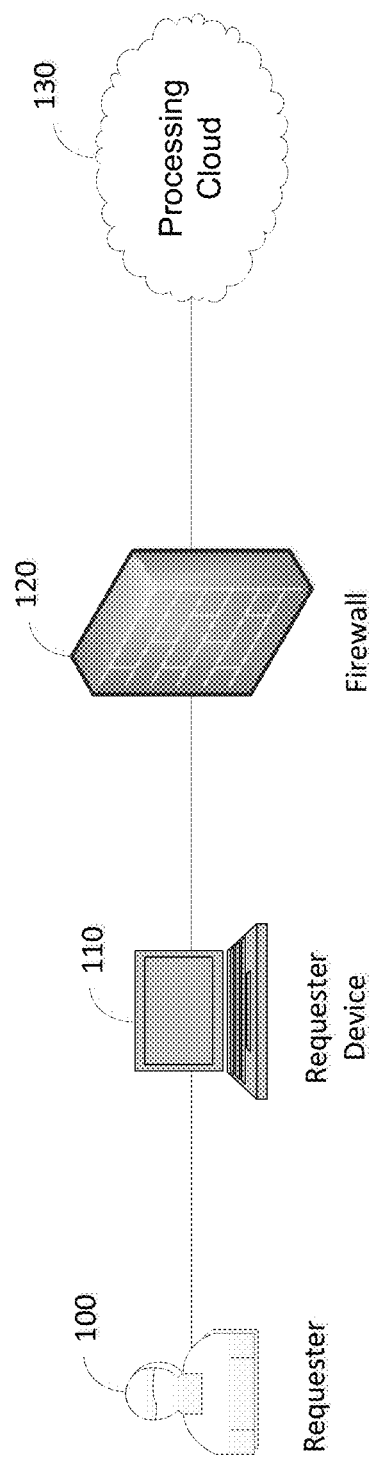
FIG. 1 schematically shows a prior art client-server architecture.
Figure 2A:
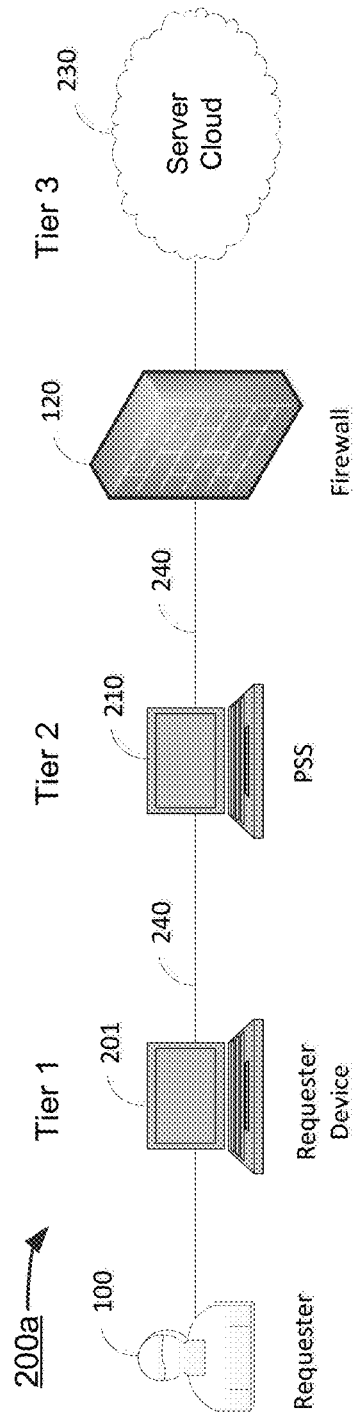
FIGS. 2A and 2B schematically show different embodiments of a three tiered security architecture in accordance with the present invention.
Figure 2B:
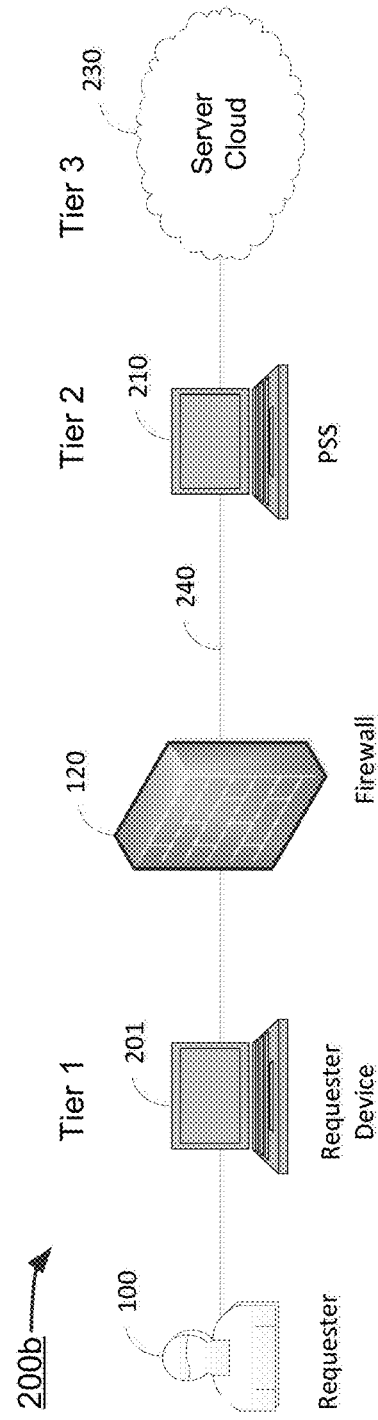

Illustrative embodiments of the invention add an additional computation layer to the standard client-server model to provide a three way architecture having enhanced security. Various embodiments of a three-tiered security architecture 200a and 200b are schematically illustrated in FIGS. 2A and 2B, respectively. A computational unit 210, called a Personal Security Server or PSS (which may also be referred-to as a "Personal Server"), participates in, and secures, all communication between a client requester device 201 and a server cloud 230. The server cloud 230 may host applications software, which applications may be referred to as "cloud application". The existence of a "cloud application" implies server computer hardware that hosts applications software. A PSS 210 may be implemented on a dedicated item of computer hardware, or on one or more client requester devices 201. The PSS 210 is coupled to a communications network 240, such as a local area network (as in FIG. 2A) or the Internet (as in FIG. 2B), for example.

Figure 3:
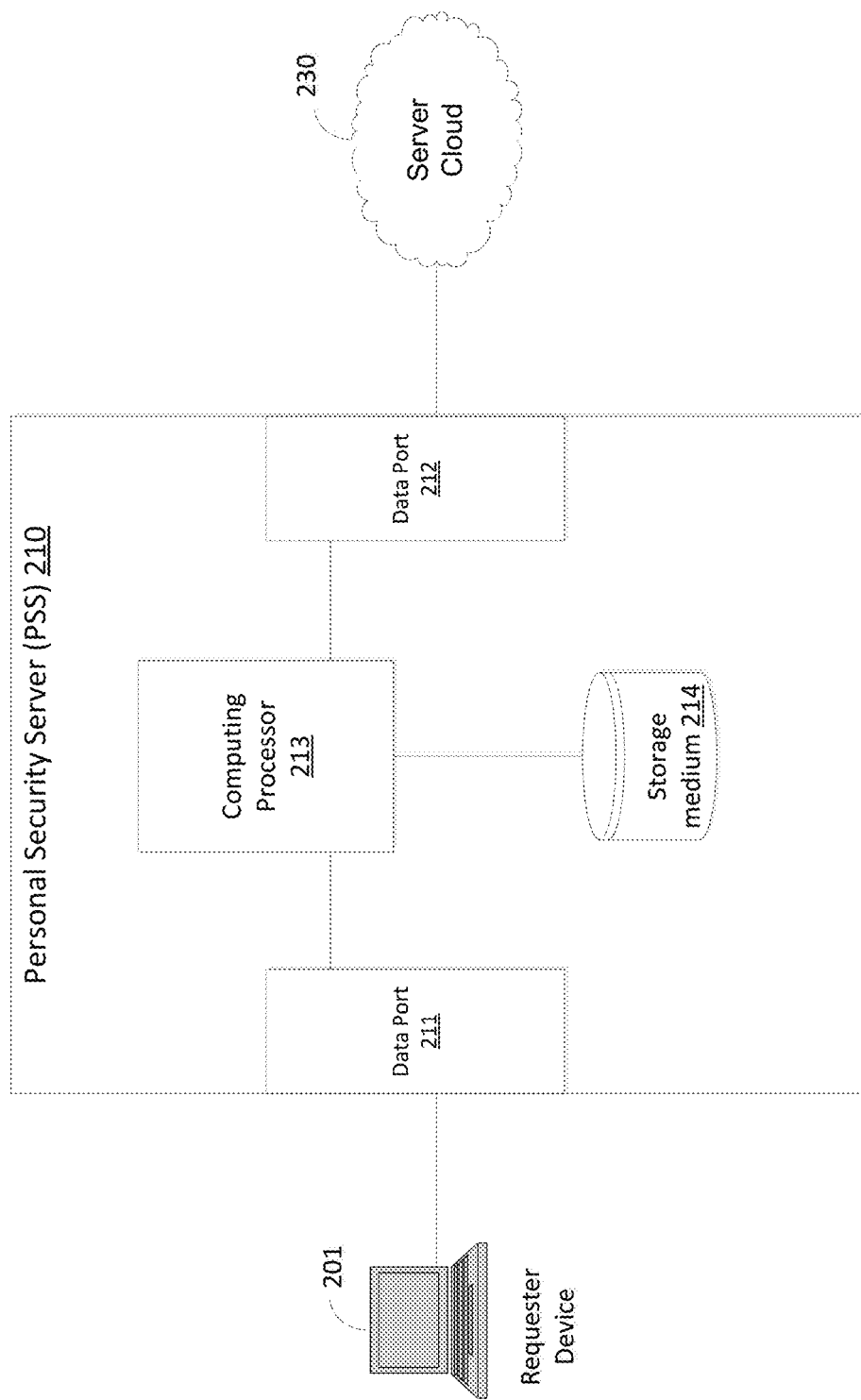
FIG. 3 schematically shows a PSS computing system in accordance with an embodiment of the invention.

FIG. 3 schematically shows a PSS computing system 210 in accordance with an embodiment of the invention. The PSS computing system 210 includes four components: two data ports 211 and 212, a computing processor 213, and a storage medium 214. These are now described in turn.

A first data port 211 couples the PSS 210 to the client requester device 201 over a first data network. As described above, the first data network may be a local area network, although other embodiments may use other data networks such as, without limitation, a cellular telephone network, a satellite network, or the Internet. A second data port 212 couples the PSS 210 to a server computer in the server cloud 230 over a second data network. As described above, the second data network may be the Internet, but any other data network may be used. Each data port 211, 212 may be a Wi-fi port, an Ethernet port, a radio port, or any similar technology known in the art to provide a data connection.

A non-transitory, tangible storage medium 214 provides volatile storage for the PSS 210. In one embodiment, the storage medium 214 is a solid state memory that provide rapid access to stored data, although other types of memory may be used in other embodiments. If non-volatile storage is desired (for example to provide a permanent audit log of transactions), the PSS 210 may include, or be coupled to, a separate storage medium (not shown), such as a hard disk drive, storage area network, or network attached storage.

In accordance with illustrated embodiments, the storage medium 214 stores two types of encrypted data. The first type of data pertains to user authentication and uniquely ties the PSS 210 to the client device 201, while the second type of data pertains to service authorization and permits the PSS 210 to access the server computer in the server cloud 230 on behalf of the user. These data are provided during an initialization phase described in more detail in connection with FIG. 4, and used during a transactional phase described in more detail in connection with FIG. 5. Out-of-band auditing of transaction history is illustrated in FIG. 6.

The computing processor 213 performs a number of tasks related to implementing cryptographic isolation, described in more detail below in connection with FIGS. 4-6. It may be implemented using a microprocessor, or similar mechanism known in the art, in combination with a set of instructions for performing these tasks (i.e., computer program code).

Figure 4:
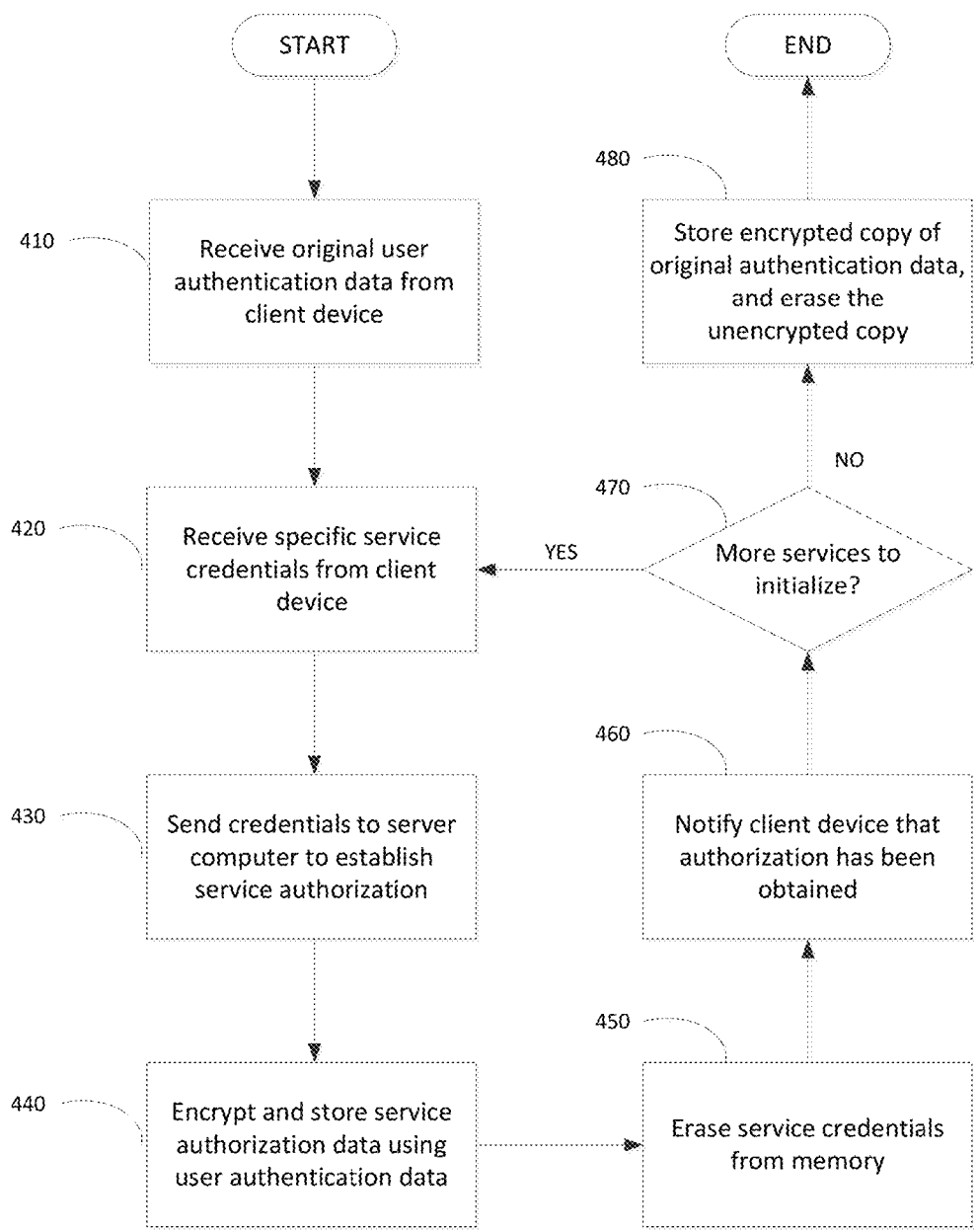
FIG. 4 is a flowchart that illustrates a method of initializing a PSS in accordance with an embodiment of the invention.

FIG. 4 is a flowchart that illustrates a method of initializing a PSS in accordance with an embodiment of the invention. A PSS stores one set of encrypted user authentication data for each authorized user of the client device, which is typically a small number, but it stores encrypted service authorization data for each service that the user(s) may access, which may be dozens or hundreds of services (or more).

In a first process 410, the PSS receives original user authentication data from the client device. These authentication data are a function of a unique property of the client device and a unique property of a user of the client device. The unique property of the client device may be any property that serves to uniquely identify the client device, such as a universally unique identifier (UUID) or a globally unique identifier (GUID) as those terms are known in the art. The unique property of the user may be any property that serves to uniquely identify the user, such as a biometric or a password known only to the user. These data are combined using a given function (such as concatenation and truncation, although other functions may be used) to form data sufficient to act as an encryption key for a reversible encryption algorithm described in more detail below.

Once the PSS has sufficient data to permit it to authenticate valid accesses from the user and the client device, it begins a loop to store authorization data that will eventually permit it to connect to multiple network services. In some embodiments, these authorization data are sent from the client device to the PSS using an application, or smartphone app. Optionally, at this point in the initialization method the PSS may securely transmit the application or app to the client device. In an alternate embodiment, the app may already be installed in the client device.

Regardless how the app appears in the client device, once a secure communications channel has been established between the PSS and the client device, in process 420 the PSS receives specific service credentials from the client device. These credentials include all data necessary for the user to access the network service, and may include such routine items as an account name or number, an email address, a username, a user password, a transactional password, and so on as known in the art. During process 420, the PSS updates its secure audit log to reflect receipt of credentials (without storing the credentials themselves in the log).

In process 430, the PSS establishes a secure connection to the server computer that performs the service, and sends the credentials to the server computer to establish a service authorization. In a preferred embodiment, a network address (e.g. host name or IP address) of the server computer for this connection is identified by reference to the requested network service only, in such a way that the client device has no knowledge of the network address. This identification may be performed, for example, by consulting a service registry that maps service identifiers to network addresses and/or a technical description of the protocol by which to connect to the service.

The PSS "logs in" to the server computer using the provided service credentials. If contact can be established and the login credentials are correct, the server computer returns to the PSS the service authorization data, which may be a data token. This token or other authorization may then be used by the PSS at a later time to log into the service. If the login is not successful, the PSS notifies the client device and returns to process 420.

If the login was successful and the PSS received a service authorization, in process 440 the PSS encrypts the authorization data and stores the encrypted copy. The encryption is performed using a reversible encryption algorithm, such as a public key encryption algorithm or a symmetric encryption algorithm as known in the art. These algorithms are reversible because they permit decryption of encrypted data using a decryption key. In accordance with illustrated embodiments of the invention, the decryption key includes the user authentication data. In this way, only the given user, accessing the PSS from the given client device, may decrypt the service authorization at a later time.

Once the encrypted service authorization data have been stored, in process 450 the PSS securely erases from its memory the unencrypted copy of these data. This process 450 ensures that any system cracker immediately cannot gain access to the unencrypted authorization token. Thus, preferably processes 440 and 450 are performed in a secure hardware environment, such as a hardware security module (HSM) as known in the art.

In process 460, the PSS notifies the client device that authorization to later use the given service has been obtained. In some embodiments, process 460 occurs on a "push" or asynchronous basis, to permit rapid receipt of service credentials from the client device while various services are simultaneously contacted in parallel. Such parallel processing can speed up the initialization process greatly if some network services are slow to establish contact or create service authorization data.

In process 470 the PSS determines whether there are more services to initialize. Typically, this process is accomplished using a proprietary protocol between the PSS and an app in the client device, and methods for doing so are well known. If additional services must be initialized, the method returns to process 420. However, if no additional services must be initialized, the method continues to process 480, in which the original user authentication data are encrypted using an irreversible encryption algorithm, the encrypted copy is stored, and the unencrypted copy is securely erased from the memory of the PSS. The irreversible encryption algorithm may be, for example, a cryptograph hash function, as that phrase is known in the art. The process 480 ensures that the unencrypted authentication data do not linger on the PSS, preventing a system cracker who gains access to the PSS from decrypting any service authorization data. The process 480 simultaneously ensures that subsequent receipt of user authentication data can be validated by comparison with the stored hash.

As an added security measure, all data transmission and reception between the PSS and the client device (and between the PSS and the server computer) may be accomplished using a cloud-based identity system. One such system is disclosed in U.S. Pat. No. 8,667,269, entitled "Efficient, Secure, Cloud-Based Identity Services", the contents of which are incorporated herein by reference in their entirety. In accordance with this security measure, the PSS may verify the identity of the device and/or user of each message (purportedly from the client device or the server computer) independently of the processes described herein, and abort the transaction if the message arrives from an unexpected source.

Figure 5:
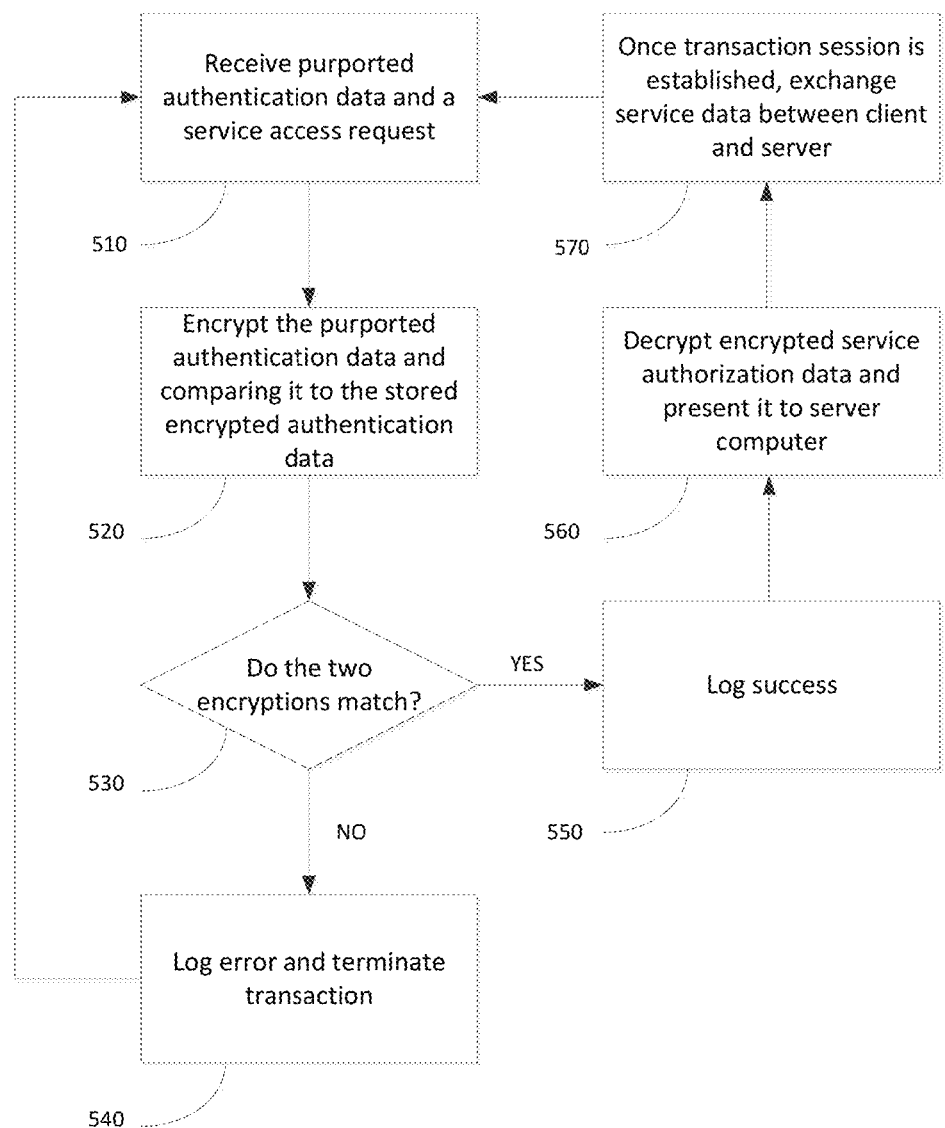
FIG. 5 is a flowchart that illustrates a method of providing cryptographic isolation between a client device and a server computer using a PSS, in accordance with an embodiment of the invention.
Figure 6:
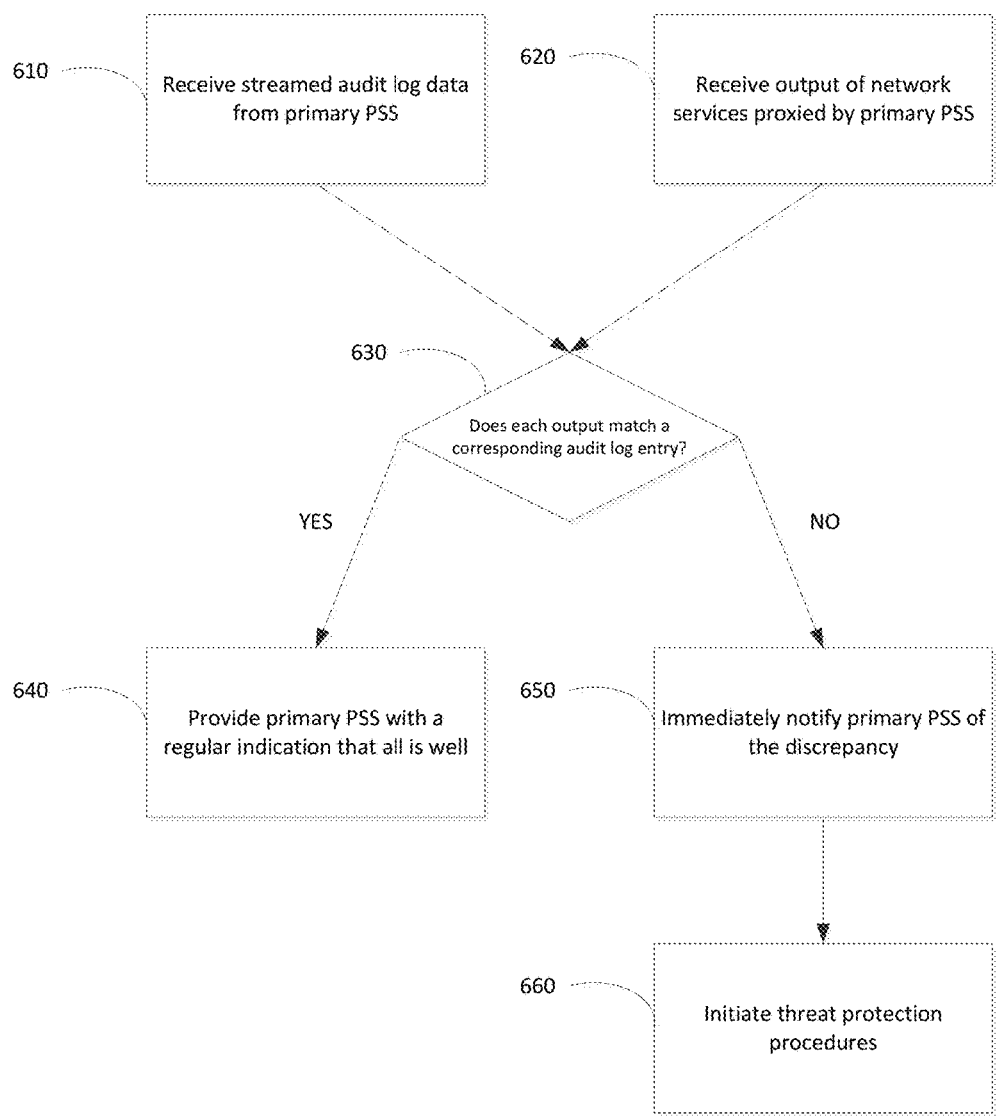
FIG. 6 is a flowchart that illustrates a method of auditing a network service using a secondary PSS in accordance with an embodiment of the invention.

FIG. 5 is a flowchart that illustrates a method of providing cryptographic isolation between a client device and a server computer using a PSS, according to an embodiment of the invention. In accordance with this embodiment, the client device no longer communicates directly with the remote server computer. When the remote service needs to be used, the PSS acts as a cryptographically isolating proxy. The client device sends encrypted transmissions to the PSS, which decrypts the message and determines the message validity. If valid, the message is re-encrypted to be readable only by the remote application. The validity check can be minor or extensive, and may include messages to other system and databases as known in the art.

The operational phase of the PSS is a loop. In the first process 510 of the loop, the PSS receives purported user authentication data in combination with a request to access a network service of the service cloud. At this point in the method, the PSS must assume that the request is a spoof—initiated by a malicious user. in some embodiments, a PSS 210 may determine that the request is false if it does not arrive using the data port 211. However, even if the request did come from the data port 211, it may have been generated without the user's permission (for example, if control of the requester device 201 has been taken over by a malicious user). Therefore, the message requires validation in all cases.

With reference to FIG. 3, a PSS 210 may build a profile of the user of a client device 201, and use details from that profile to assess the validity of a message purporting to be from that user. Such a user profile may include the PSS audit log mentioned above. The PSS log is like a fingerprint in that it uniquely identifies the user, since the chance of another user having an identical PSS log are infinitesimally small. The user profile may also include information such as one or more IP addresses from which a client device 201 has sent messages or otherwise accessed the PSS 210. As another example, if the client device 201 is capable of ascertaining and transmitting its geographic location, the user profile may include the geographic location from which the client device 201 has sent messages or otherwise accessed the PSS 210. Any communication from the client device 201 may be checked against the user's profile to assess whether the message is actually from the user.

A system cracker who has gained access to the user's credentials (e.g., user name, password) may attempt to imitate the user, but the PSS 210 would recognize that the computer from which the hacker contacts the PSS does not have the same user log (e.g., fingerprint), or is communicating from a different, unfamiliar IP address. If a cracker obtains a client device 201 and attempts to use the device to communicate to or through the PSS 210, the PSS 210 may recognize that the device is communicating from an unusual or unfamiliar geographic location. For example, if a thief obtains and uses the smart phone of a user who lives in New York City and who has historically accessed the PSS 210 from geographical locations, the thief s use of the smart phone from San Diego would be flagged as suspicious by the PSS 210. The PSS 210 may then decline to process the communication from the smart phone 201, or may request additional verification from the user using an alternate, out-of-band communications channel.

As a final check of message validation, process 520 encrypts the purported authentication data using the same algorithm as the original, verified authentication data, and in process 530 the encrypted purported data are compared to the stored, encrypted, verified data. If the validation is unsuccessful, in process 540 the PSS logs the error in its secure audit log, terminates the transaction, and may optionally take other threat-protection measures known in the art. For example, the PSS may notify the sending of the purported user authentication data that access was denied, and permit a number of additional attempts to validate the data before the PSS permanently denied access and requires re-authentication. Then, the method returns to process 510 and the PSS awaits the next service access request.

However, if the validation is successful, that fact is also logged by the PSS in process 550, and the transaction is allowed to proceed. The PSS log of successes and failures may be stored in the storage medium 214, or in another location. It may never be altered, however based on its size it may be archived to other devices external to the PSS.

In process 560, the purported authentication data, which have now been verified as genuine, are used to decrypt the service authorization data stored during initialization for the particular service requested, and the decrypted service authorization data are securely transmitted to the server computer. As noted above, this communication, and subsequent communications required to establish a session, may use the secure cloud-based identity services of U.S. Pat. No. 8,667,269.

Decryption of the service authorization data requires using the original user authentication data as a decryption parameter, to prevent anyone other than the original user from accessing the service. Although the original, unencrypted authentication data are not stored in the PSS (as described above in connection with FIG. 4), the match between the encrypted received authentication data and the stored, encrypted original authentication data means that the received purported data are actually the same as the original data. Thus, the received authentication data may be used in their unencrypted form as a substitute for the original data to decrypt the service authorization data. Once the decryption is complete and the unencrypted service authorization data are recovered, the PSS once again securely deletes the authentication data.

Finally, in process 570, the PSS receives an indication from the server computer that it has accepted the service authorization data and begun a transaction session. In response, the PSS begins to exchange service messages between the client device and the server computer according to the protocol of the network service. When the transaction has been completed, the method returns to process 510 to await the next service access request.

In addition to the validation steps that the PSS performs, many other computations may be done. Computations could be offloaded from the client device (e.g. using the architecture of FIG. 2A) or from the network service (e.g. using the architecture of FIG. 2B). With respect to the latter possibility, since the client device has no control over the PSS, secure transactions can be accomplished for the network service, advantageously providing service scalability. In one embodiment each user has a single PSS. In this embodiment, the network service is not limited by the size of its owned hardware, but may expand to include a multitude of PSSes as a secure computing resource, thus "extending the cloud". In another embodiment, each user has a single PSS for each network service, providing cryptographic isolation between different network services at the client side of the network, rather than the server side.

FIG. 6 is a flowchart that illustrates an out-of-band method of auditing a network service using a secondary PSS in accordance with an embodiment of the invention. The method shown in FIG. 6 assumes that a primary PSS is processing requests for network services according to FIGS. 4 and 5, and moreover is providing real-time access to its audit log to a secondary, auditing PSS. It should be appreciated that auditing and fraud notification is only one application of the extended cloud.

In process 610, the secondary PSS receives streamed audit log data from the primary PSS. Simultaneously, in process 620, the secondary PSS receives an output of the network services provided by the primary PSS. Any network service that produces a publicly consumable output stream may be monitored by process 620. For example, if one network service accessed by the client device is TWITTER, process 620 includes monitoring the user's TWITTER feed.

In process 630, the audit log data are compared to the public output stream to determine whether each output matches a corresponding log entry. The PSS must have a corresponding transaction for each stream entry the stream has for our user, and the authorized user had to initiate the transaction. The stream may contain additional data element that can be check such destination, dollars amounts or any other data the would carried from input to output with changing. All of these data element will be compared to the original transaction. These must match based on application. In this way, a computer failure such as malware, virus or malfunction that effects the transaction data can be identified.

If the audit logs match the output stream, then the method continues to process 640, in which the secondary PSS provides the primary PSS with a regular indication that all is well. However, if the audit log data do not match the public output stream, the method continues to process 650, in which the secondary PSS immediately notifies the primary PSS of the discrepancy. If a log entry exists but there is no corresponding output in the public output stream, it may be that the network service experienced a problem executing a request. Conversely, if an output exists in the public output stream but there is no corresponding log entry, it may be that the network service received a spoofed request from a source other than the PSS, and that therefore the user's login credentials have been compromised. In either case, the reliability of the client-server relationship has been compromised, and in process 660 the secondary PSS initiates threat protection procedures. Such procedures may include, without limitation: instructing the network service to disable the user's login credentials; sending an email, text, or automated telephone call to a monitoring center; and contacting the user via an out-of-band communications facility that does not rely on the client device.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computing system for providing cryptographic isolation between a client device and a server computer for providing a network service to the client device, the computing system comprising:
   a first data port coupled to the client device;
   a second data port coupled to the server computer;
   a non-transitory, tangible storage medium in which is stored (a) an encryption, using an irreversible encryption algorithm, of original user authentication data that are a function of a unique property of the client device and a unique property of a user of the client device, and (b) an encryption, using a reversible encryption algorithm that uses the original user authentication data as a decryption parameter, of service authorization data required by the server computer to be presented to the server computer as a condition of permitting the user to access the network service; and
   a computing processor configured to receive purported user authentication data in combination with a request to access the network service, and in response to such receipt, to perform the processes of:
      encrypting the purported user authentication data using the irreversible encryption algorithm to produce encrypted purported user authentication data;
      only when the encrypted purported user authentication data matches the stored encryption of the original user authentication data, decrypting the encryption of the service authorization data to produce decrypted service authorization data;
      presenting, to the server computer using the second data port, the decrypted service authorization data in combination with a request to access the network service on behalf of the user; and
      upon receipt in the computing system from the server computer of data indicating that the user is authorized to access the network service, exchanging service data between the client device using the first data port and the server computer using the second data port.

2. A system according to claim 1, wherein the client device comprises a desktop computer, laptop computer, tablet computer, or smartphone.

3. A system according to claim 1, wherein the first data port is coupled to a local area network.

4. A system according to claim 1, wherein the second data port is coupled to the Internet.

5. A system according to claim 1, wherein the irreversible encryption algorithm comprises a cryptographic hash function.

6. A system according to claim 1, wherein the reversible encryption algorithm comprises a public key encryption algorithm or a symmetric encryption algorithm.

7. A system according to claim 1, wherein the unique property of the client device comprises a universally unique identifier (UUID) or a globally unique identifier (GUID).

8. A system according to claim 1, wherein the unique property of the user of the client device comprises a biometric or a password known only to the user.

9. A system according to claim 1, wherein the computing processor is further configured to perform cryptographic data communications over the first data port using a secret shared only between the computing system and the client device.

10. A system according to claim 1, wherein the computing processor is further configured to perform cryptographic data communications over the second data port using a secret shared only between the computing system and the server computer.

11. A system according to claim 1, wherein the computing processor is further configured to avoid communicating a network address of the client device to the second data port, and to avoid communicating a network address of the server computer to the first data port.

12. A method of providing cryptographic isolation between a client device and a server computer for providing a network service to the client device, using a computing system that intermediates between the client device and server computer, the method comprising:
   at the request of the client device, storing by the computing system, an encryption, using an irreversible encryption algorithm, of original user authentication data that are a function of a unique property of the client device and a unique property of a user of the client device;
   at the request of the server computer, storing by the computing system, an encryption, using a reversible encryption algorithm that uses the original user authentication data as a decryption parameter, of service authorization data required by the server computer to be presented to the server computer as a condition of permitting the user to access the network service;
   upon receipt in the computing system, of purported user authentication data in combination with a request to access the network service:

encrypting the purported user authentication data using the irreversible encryption algorithm to produce encrypted purported user authentication data;

only when the encrypted purported user authentication data matches the stored encryption of the original user authentication data, decrypting the encryption of the service authorization data to produce decrypted service authorization data;

presenting, to the server computer, the decrypted service authorization data in combination with a request to access the network service on behalf of the user; and upon receipt in the computing system from the server computer of data indicating that the user is authorized to access the network service, exchanging service data between the client device and the server computer.

13. A method according to claim 12, wherein the client device is a desktop computer, laptop computer, tablet computer, or smartphone.

14. A method according to claim 12, wherein the irreversible encryption algorithm comprises a cryptographic hash function.

15. A method according to claim 12, wherein the reversible encryption algorithm comprises a public key encryption algorithm or a symmetric encryption algorithm.

16. A method according to claim 12, wherein the unique property of the client device comprises a universally unique identifier (UUID) or a globally unique identifier (GUID).

17. A method according to claim 12, wherein the unique property of the user of the client device comprises a biometric or a password known only to the user.

18. A method according to claim 12, further comprising performing cryptographic data communications using a secret shared only between the computing system and the client device.

19. A method according to claim 12, further comprising performing cryptographic data communications using a secret shared only between the computing system and the server computer.

20. A non-transitory, tangible storage medium in which is stored computer program code for providing cryptographic isolation between a client device and a server computer for providing a network service to the client device, using a computing system that intermediates between the client device and server computer, the storage medium comprising computer program code for:

at the request of the client device, storing by the computing system, an encryption, using an irreversible encryption algorithm, of original user authentication data that are a function of a unique property of the client device and a unique property of a user of the client device;

at the request of the server computer, storing by the computing system, an encryption, using a reversible encryption algorithm that uses the original user authentication data as a decryption parameter, of service authorization data required by the server computer to be presented to the server computer as a condition of permitting the user to access the network service;

upon receipt in the computing system, of purported user authentication data in combination with a request to access the network service:

encrypting the purported user authentication data using the irreversible encryption algorithm to produce encrypted purported user authentication data, only when the encrypted purported user authentication data matches the stored encryption of the original user authentication data, decrypting the encryption of the service authorization data to produce decrypted service authorization data;

presenting, to the server computer, the decrypted service authorization data in combination with a request to access the network service on behalf of the user; and upon receipt in the computing system from the server computer of data indicating that the user is authorized to access the network service, exchanging service data between the client device and the server computer.

* * * * *